United States Patent
Han et al.

(10) Patent No.: US 8,782,684 B2
(45) Date of Patent: Jul. 15, 2014

(54) METHOD AND DEVICE FOR COLLECTING AUDIENCE INFORMATION

(71) Applicant: Agency for Science, Technology and Research, Singapore (SG)

(72) Inventors: Shuguo Han, Singapore (SG); Ghim Eng Yap, Singapore (SG); Wei Yun Yau, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 6 days.

(21) Appl. No.: 13/672,111

(22) Filed: Nov. 8, 2012

(65) Prior Publication Data

US 2013/0132989 A1 May 23, 2013

(30) Foreign Application Priority Data

Nov. 8, 2011 (SG) ................................. 201108226-0

(51) Int. Cl.
*H04H 60/32* (2008.01)
*H04N 21/442* (2011.01)
*H04H 60/43* (2008.01)

(52) U.S. Cl.
CPC ......... *H04N 21/44222* (2013.01); *H04H 60/32* (2013.01); *H04H 60/43* (2013.01)
USPC .............................................. 725/14; 725/16

(58) Field of Classification Search
CPC .. H04H 60/32; H04H 60/43; H04N 21/44222
USPC .......................................................... 725/14
See application file for complete search history.

(56) References Cited

U.S. PATENT DOCUMENTS

| | | | | |
|---|---|---|---|---|
| 5,862,223 | A * | 1/1999 | Walker et al. | 705/50 |
| 6,460,036 | B1 * | 10/2002 | Herz | 707/748 |
| 6,463,533 | B1 * | 10/2002 | Calamera et al. | 713/163 |
| 7,398,388 | B2 * | 7/2008 | Xu et al. | 713/163 |
| 7,444,655 | B2 * | 10/2008 | Sardera | 725/9 |
| 7,546,619 | B2 * | 6/2009 | Anderson et al. | 725/35 |
| 8,181,195 | B2 * | 5/2012 | Sardera | 725/14 |
| 2002/0128871 | A1 * | 9/2002 | Adamson et al. | 705/3 |
| 2003/0028890 | A1 * | 2/2003 | Swart et al. | 725/91 |
| 2003/0163689 | A1 * | 8/2003 | Xu et al. | 713/163 |
| 2003/0229892 | A1 * | 12/2003 | Sardera | 725/9 |
| 2005/0278731 | A1 * | 12/2005 | Cameron et al. | 725/14 |
| 2006/0287915 | A1 * | 12/2006 | Boulet et al. | 705/14 |
| 2006/0293954 | A1 * | 12/2006 | Anderson et al. | 705/14 |
| 2006/0293955 | A1 * | 12/2006 | Wilson et al. | 705/14 |
| 2007/0022032 | A1 * | 1/2007 | Anderson et al. | 705/35 |
| 2008/0052739 | A1 * | 2/2008 | Logan | 725/25 |
| 2008/0301727 | A1 * | 12/2008 | Cristofalo et al. | 725/35 |

(Continued)

*Primary Examiner* — Nasser Goodarzi
*Assistant Examiner* — Michael B Pierorazio
(74) *Attorney, Agent, or Firm* — K. David Crockett, Esq.; Niky Economy Syrengelas, Esq.; Crockett & Crockett, PC

(57) ABSTRACT

Various embodiments provide a method for collecting audience information of a group of users in an audience measurement. The method may include each user dividing its private information into a private portion and a predetermined number of exchange portions; each user transmitting each of its exchange portions to a respective user of the predetermined number of users selected from the group of users; each user aggregating its private portion and exchange portions received from other users of the group of users, thereby producing randomized information; and aggregating the randomized information of the group of users, thereby producing aggregated private information for the group of users.

15 Claims, 5 Drawing Sheets

(56) References Cited

U.S. PATENT DOCUMENTS

| | | | |
|---|---|---|---|
| 2009/0044246 A1* | 2/2009 | Sheehan et al. | 725/146 |
| 2010/0023338 A1* | 1/2010 | Petronelli et al. | 705/1 |
| 2011/0067046 A1* | 3/2011 | Cox et al. | 725/14 |
| 2011/0289524 A1* | 11/2011 | Toner et al. | 725/14 |
| 2012/0023522 A1* | 1/2012 | Anderson et al. | 725/35 |
| 2012/0066706 A1* | 3/2012 | Setos | 725/14 |
| 2012/0131481 A1* | 5/2012 | Gupta et al. | 715/764 |
| 2012/0151597 A1* | 6/2012 | Gupta et al. | 726/26 |
| 2012/0215845 A1* | 8/2012 | Aad et al. | 709/204 |
| 2012/0245955 A1* | 9/2012 | Bari et al. | 705/3 |
| 2012/0266254 A1* | 10/2012 | Gupta et al. | 726/26 |
| 2012/0266255 A1* | 10/2012 | Gupta et al. | 726/26 |
| 2012/0284746 A1* | 11/2012 | Evans et al. | 725/34 |
| 2012/0304207 A1* | 11/2012 | Hughes et al. | 725/14 |
| 2013/0086390 A1* | 4/2013 | Kennedy et al. | 713/189 |

* cited by examiner

METHOD AND DEVICE FOR COLLECTING AUDIENCE INFORMATION

CROSS-REFERENCE TO RELATED APPLICATIONS

The present application claims the benefit of Singapore patent application 201108226-0 filed on Nov. 8, 2011, the contents of which are incorporated herein by reference for all purposes.

TECHNICAL FIELD

Embodiments relate generally to audience measurement. Specifically, embodiments relate to a method and a device for collecting audience information in an audience measurement.

BACKGROUND

An audience measurement is generally a measurement of usage statistics in relation to a consumption of content data, for example, in relation to television viewership, radio listenership, newspaper/magazine readership, and web traffic on websites, etc.

FIG. 1 shows an overall ecosystem of Internet Protocol Television (IPTV), wherein every home 101 is connected to a service provider 131 via an IP network 111, which provides IPTV services (e.g. content delivery, interactive gaming) to each home 101. The IP network 111 may be a broadband IP network, e.g. Internet. The service provider 131 receives content from a content provider 141, and delivers the content from the IP network 111 to an IPTV set-top box 103 of each home 101 through a home network gateway 105 and a home network 107. Audience measurement (AM) in IPTV measures end-user behavior in IPTV services, and generates reports on audience information including audience rating, audience engagement, audience movement across programs and applications, audience makeup by segments, and increasing or decreasing popularity of content, etc. These reports are valuable to businesses because they can be used to forecast advertising opportunities, to target specific advertisements and campaigns to particular audience segments across devices, and to provide personalized engagement-driven services to end-users.

In IPTV services, information that must be known by service providers and content providers to facilitate the consumption of IPTV services is referred to as necessary information. Since these are minimally necessary data that would be released to service providers or content providers even without considering AM, their privacy are controlled by the policy-based schemes as done in the existing systems. On the other hand, information collected from the individual viewers/users for the explicit purpose of audience measurement, e.g. numbers of viewers, segmentation of viewers, ratings, audience engagement, is referred to as private information.

Although the measured private information allows businesses to better understand and categorize their end users, many users are uncomfortable with releasing their private information to businesses for fear of privacy breach. Hence, the ITU-T Standardization Group recommends that an AM system provides different levels of permissions for the users to dictate, and the AM system obtains permissions from users before measuring their data. This permission-based control is essentially a "can see, can use; cannot see, cannot use" scheme. With the required level of permission, the data becomes plain to the AM system and it is up to the system to guard the information. That means, once the user gives the permission, the private data of the user is fully transparent to the AM system. Thus, many users who are concerned about privacy may not give permission to disclose their private data, which skews the AM reports towards the less sensitive users, making the reports much less useful and accurate to businesses.

One approach uses Shamir's secret sharing to protect the user's private information. In Shamir's secret sharing, each of n parties is allocated a unique share of a secret, such that the secret is hidden unless one obtains possession of the shares from at least k parties. Applied to the situation of protecting user's private information in audience measurement, the secret is the aggregated information of the private user data. In one implementation, the n users first agree on k common receivers. Each user sends k polynomials, which is used to hide its portion of secret, to these k receivers only. Each of the k receivers consolidates its received polynomials and exchanges these values between receivers to reconstruct the original secret. Exchanging messages should be confidential, otherwise the private values can be easily known to malicious listeners. This can be prevented using any public key cryptosystem, wherein a message to be transmitted is first encrypted by the sender using the receiver's public key and then decrypted by the receiver using its secret private key. This approach requires all the n users to agree on a common group of k receivers. However, once this group of receivers is compromised, the private values of all users are compromised. In addition, such an agreement on a common group of receivers is not easy to achieve among large audiences, especially in the dynamically changing environment composing of IPTV viewers.

SUMMARY

Various embodiments provide a method for collecting audience information of a group of users in an audience measurement. The method may include each user dividing its private information into a private portion and a predetermined number of exchange portions; each user transmitting each of its exchange portions to a respective user of the predetermined number of users selected from the group of users; each user aggregating its private portion and exchange portions received from other users of the group of users, thereby producing randomized information; and aggregating the randomized information of the group of users, thereby producing aggregated private information for the group of users.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
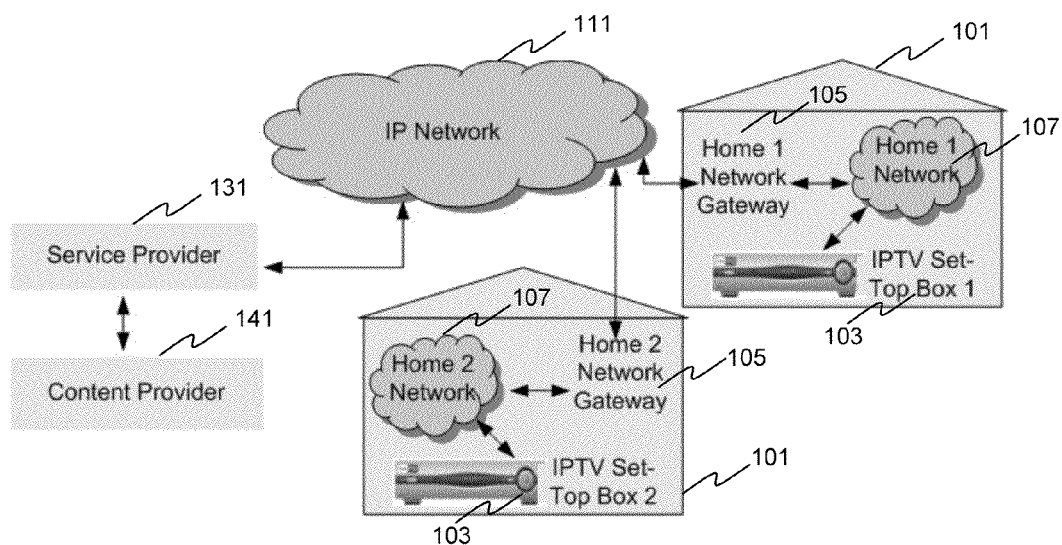
FIG. 1 shows an overall ecosystem of Internet Protocol Television (IPTV).

Various embodiments provide a method and a device for collecting audience information in an audience measurement in a more accurate, secure and efficient manner, such that more accurate audience information is collected while at the same time protecting the privacy of the users. Various embodiments allow for the generation of desired audience measurement report but at the same time ensure that user's private data stay private to themselves.

Various features described below in the context of the method for collecting audience information may analogously hold true for the corresponding device for collecting audience information and the corresponding user device for providing audience information, and vice versa.

In this context, the device and the user device as described in this description may include a memory which is for example used in the processing carried out by the device and the user device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In this context, the device and the user device as described in this description may be or may include one or more circuits for carrying out the method of collecting audience information.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

One embodiment is directed to a method for collecting audience information of a group of users in an audience measurement. The method may include each user dividing its private information into a private portion and a predetermined number of exchange portions; each user transmitting each of its exchange portions to a respective user of the predetermined number of users selected from the group of users; each user aggregating its private portion and exchange portions received from other users of the group of users, thereby producing randomized information; and aggregating the randomized information of the group of users, thereby producing aggregated private information for the group of users.

In an embodiment, the dividing of the private information by each user may include randomly dividing its private information into the private portion and the predetermined number of exchange portions.

In an embodiment, each user independently selects the predetermined number of users from the group of users, and transmitting each of its exchange portions to the respective selected user. In other words, referring to the users performing transmission of exchange portions as senders, the selected users acting as a receiver group for one sender may be different from those of other senders. In another embodiment, each user may dynamically change/modify its receiver group any time before an audience measurement service is requested.

According to an embodiment, each user may encrypt its predetermined number of exchange portions, and transmit each of the encrypted exchange portions to the respective user selected from the group of users.

In one embodiment, each user may encrypt each of its exchange portions using a public key of the respective user selected to receive the respective encrypted exchange portion. The public key of the respective user may be a public key of any cryptosystem. In an embodiment, the public key of the respective user may be a public key of an additively homomorphic cryptosystem.

Each user may receive the encrypted exchange portions from other users of the group of users, and decrypt the received encrypted exchange portions. In an embodiment, each user may decrypt the received encrypted exchange portions using its private key. The private key may be a private key of any cryptosystem. In an embodiment, the private key may be a private key of an additively homomorphic cryptosystem.

In an embodiment, each user may consolidate the received encrypted exchange portions, and decrypt the consolidated encrypted exchange portions. According to an embodiment wherein the encrypted exchange portions were encrypted using public keys of an additively homomorphic cryptosystem, each user may consolidate the received encrypted exchange portions by multiplying the received encrypted exchange portions, and decrypt the product of the received encrypted exchange portions, as will be described in more detail below.

Each user may aggregate its private portion and the decrypted exchange portions, thereby producing the randomized information of the user. In an embodiment, the aggregating of the private portion and the decrypted exchange portions by each user may include summing the private portion and the decrypted exchange portions.

In an embodiment, the aggregating of the randomized information may include summing the randomized information of the group of users to produce the aggregated private information for the group of user.

According to an embodiment, the aggregated private information for the group of users is transmitted to an audience measurement server. In other words, only the aggregated private information for the entire group of users is released to the audience measurement server, whereas each user's private information is not revealed.

In the above embodiments, the predetermined number may be less than the number of users in the group of users. Accordingly, each user selects the predetermined number of users for receiving its predetermined number of exchange portions.

In the above embodiments, the private information of each user may include one or more pieces of information selected from the group consisting of: a number of viewers; demographic of viewers; ratings; audience movement across programs and applications; audience engagement; and interaction of viewers. For example, information about demographic of viewers may include the segmentation of viewers by age, sex, or income, etc. For example, information about the ratings may include scoring or ranking of a content or program by viewers. For example, information about audience engagement may include duration, frequency, or recency of viewers viewing a content or program. For example, information about interaction of viewers may include vote, review, comments, or input from viewers, such as input to a remote control from viewers. In other embodiments, the private information may include other types of information required by or related to an audience measurement.

In an embodiment, the private information of each user may be a number, or may be represented by a number. In one embodiment, the private information may be a piece of information which is a number. For example, in an embodiment wherein the private information is about the number of viewers, the private information is accordingly a number representing the number of viewers. In another embodiment, the private information may be a piece of information which is non-numeric but can be represented by a number. In an illustrative example wherein the private information is about the gender type of a viewer, the private information may be represented by a number "1" if the sex of the viewer is male, and by a number "0" if the sex of the viewer is not male.

According to an embodiment, each user may divide its private information by splitting the number into a plurality of sub-numbers, wherein a sum of the plurality of sub-numbers equals to the number representing the private information. In an embodiment, the number representing the private information may be randomly split into the plurality of sub-numbers.

According to an embodiment, each user may sum its private portion and the exchange portions received from other users of the group of users to produce its randomized information.

According to an embodiment, the randomized information of the group of users may be summed to produce the aggregated private information for the group of users.

Various embodiments described in the context of the method for collecting audience information are analogously valid for the corresponding device and the corresponding user device.

Another embodiment is directed to a user device for providing audience information in an audience measurement, corresponding to the method described above.

The user device may include a divider configured to divide its private information into a private portion and a predetermined number of exchange portions; a transmitter configured to transmit each of its exchange portions to a respective user device of the predetermined number of user devices selected by the user device; a receiver configured to receive exchange portions from other user devices of a group of user devices; and an aggregator configured to aggregate its private portion and the exchange portions received from said other user devices, thereby producing randomized information of the user device.

In accordance with the above embodiment, the user device produces randomized information, which may be then transmitted to the outside of the user device for an audience measurement. Since only randomized information, instead of the original private information of the user device, is transmitted out, the private information of the user device is kept confidential and protected.

In an embodiment, the user device may further include an encryptor configured to encrypt its predetermined number of exchange portions. This provides further protection to the exchange portions. The encryptor may be configured to encrypt the exchange portions using any existing cryptosystem. In an embodiment, the encryptor may encrypt the exchange portions using public keys of the respective users devices selected for receiving the exchange portions. In an embodiment, the public keys may be of an additively homomorphic cryptosystem.

In a further embodiment, the user device may further include a decryptor configured to decrypt the exchange portions received from said other user devices. The decryptor may be configured to decrypt the received exchange portions using any existing cryptosystem. In an embodiment, the decryptor may decrypt the received exchange portions using a private key of the user device. In an embodiment, the private key may be of an additively homomorphic cryptosystem.

The divider, transmitter, receiver, aggregator, encryptor and decryptor of the user device may be implemented as one or more circuits as described above, or may be integrated as one circuit.

The user device may be an end-user terminal which receives content from a service provider, such as an IPTV, an Internet TV, a digital television service provider, a mobile television service provider. In various embodiments, the user device may be implemented as a TV set, a set-top box, a mobile device, a PDA, a smart card, a SIM card, a computer, etc.

A further embodiment is directed to a device for collecting audience information of a group of users in an audience measurement. The device may include a receiver configured to receive randomized information from the group of users, said randomized information from each user representing an aggregation of parts of private information from a plurality of users; and an aggregator configured to aggregate the received randomized information to produce aggregated private information for the group of users.

In an embodiment, the device may further include a transmitter configured to transmit the aggregated private information to an audience measurement server.

The device may be an intermediate device between the user devices and the audience measurement server. This intermediate device may aggregate the collected randomized information from the group of users, and provide the aggregated private information to the audience measurement server. In this manner, the private information of each user device is not revealed to the audience measurement server, but only the aggregated private information is provided to the audience measurement server.

Figure 2:
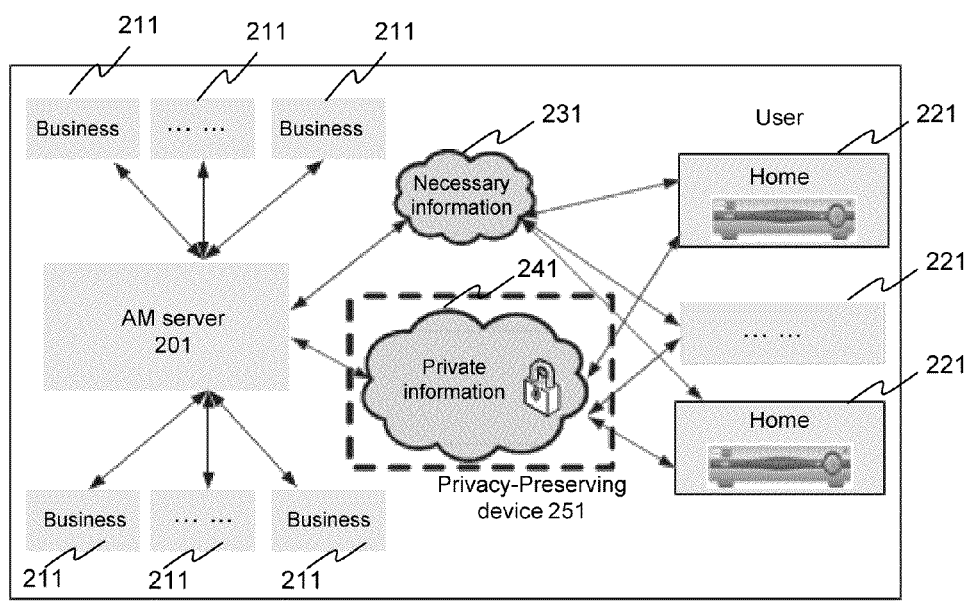
FIG. 2 shows an IPTV system according to an embodiment.

FIG. 2 shows an IPTV system according to an embodiment.

An audience measurement server 201 provides AM services for businesses 211. The audience measurement server 201 measures audience information from a plurality of users 221, and transmits the audience information to the respective business 211.

Necessary information 231, which is minimally necessary data to facilitate the consumption of IPTV services, may be transmitted from the users 221 to the audience measurement server 201 under the control of the policy-based schemes as done in the existing information.

Private information 241, which needs to be protected, is processed by a privacy-preserving device 251 according to various embodiments. As shown in FIG. 2, instead of transmitting their original private information directly to the audience measurement server 201, the users 221 may produce randomized information and transmit their randomized information to the privacy-preserving device 251. The privacy-preserving device 251 may aggregate the received randomized information from the users 221, and transmit the aggregated private information 241 to the audience measurement server 201. The privacy-preserving device 251 thus allows for an accurate AM report to be generated for a group of users, but does not allow the audience measurement server 201 to learn each user's private data.

Figure 3:
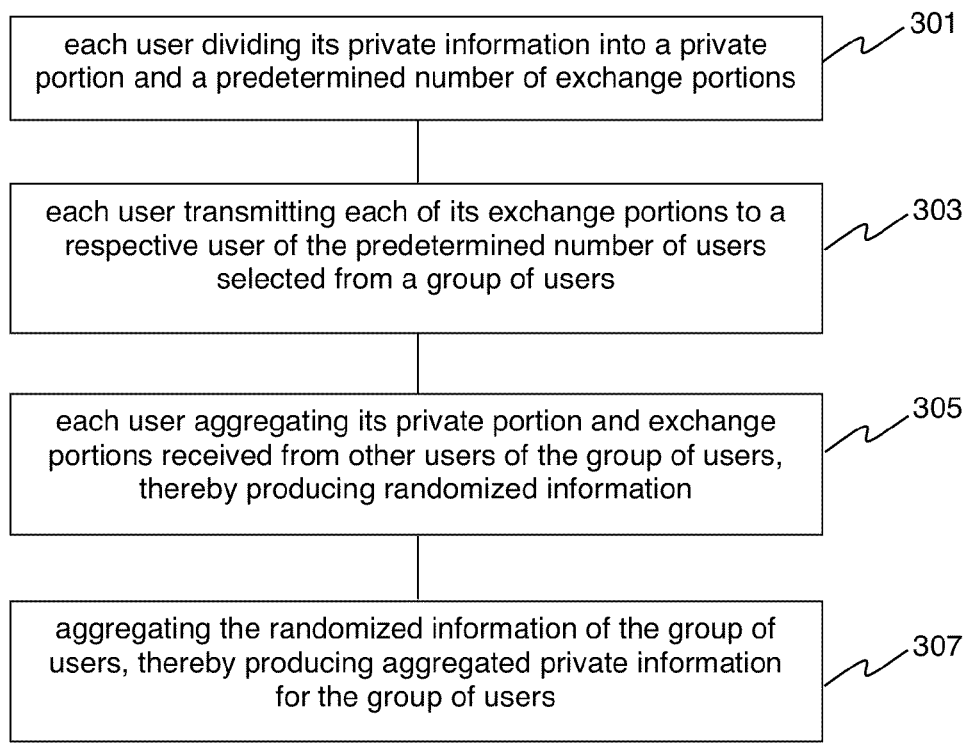
FIG. 3 shows a flowchart illustrating a method for collecting audience information of a group of users in an audience measurement according to an embodiment.

FIG. 3 shows a flowchart illustrating a method for collecting audience information of a group of users in an audience measurement according to an embodiment.

At 301, each user divides its private information into a private portion and a predetermined number of exchange portions. In an embodiment, each user may randomly divide its private information. In another embodiment, the private information may be a number, and each user may split the number into a plurality of sub-numbers such that a sum of the plurality of sub-numbers equals to the number.

At 303, each user transmits each of its exchange portions to a respective user of the predetermined number of users selected from the group of users. In an embodiment, each user may independently select its predetermined number of users for receiving its exchange portions.

In a further embodiment, before transmitting its exchange portions, each user may encrypt each of its exchange portions and then transmit the encrypted exchange portions to the respective selected users.

At 305, each user aggregates its private portion and exchange portions received from other users of the group of users, thereby producing randomized information.

In an embodiment, the aggregating of the private portion and the received exchange portions may include summing the private portion and the received exchange portions.

In an embodiment, the exchange portions received from other users may have been encrypted, and the user receiving the encrypted exchange portions may decrypt the received encrypted exchange portions accordingly.

In an embodiment, the encrypted exchange portions may be encrypted using a public key of the user receiving the encrypted exchange portions. The user receiving the thus encrypted exchange portions may decrypt the encrypted exchange portions using its corresponding private key.

In another embodiment, the user may consolidate the received encrypted exchange portions and decrypt the consolidated encrypted exchange portions. In an embodiment wherein the encrypted exchange portions have been encrypted using a public key according to an additively homomorphic cryptosystem, the user may consolidate the received encrypted exchange portions by multiplying these encrypted exchange portions. The user may then decrypt the product of the encrypted exchange portions in one operation, and does not need to separately decrypt each encrypted exchange portion.

Each user may aggregate its private portion and the decrypted exchange portions to produce its randomized information.

At 307, the randomized information of the group of users is aggregated, thereby producing aggregated private information for the group of users.

In an embodiment, the randomized information of the group of users may be aggregated by summing the randomized information of the group of users.

After obtaining the users' permission to "use" their data for audience measurement, the method and device of various embodiments are able to derive the aggregation of measured private data (e.g., the number of people watching a program, the segmentation of sex, ages of audience, etc.) without each user ever having to reveal their private data to the AM server or anyone else. Whenever the private data are evaluated, the privacy-preserving functions, e.g. provided by the privacy-preserving device 251 of FIG. 2, only provide randomized information to the AM server. The privacy-preserving device allows the aggregation of private date but does not reveal the private data of users. In contrast to the current ITU-T standardization body which recommends to obtain user permission before measuring and the private data of the user is fully transparent to the AM system once user permission is given, the method and device of various embodiments protect the users' privacy even after user permissions are granted. With this advantageous feature, the sensitive users are more likely to accept audience measurement, making the AM reports much more accurate. Businesses would then see more values in buying the AM services and acting on the aggregated audience information to better serve the viewers.

Various embodiments provide a solution to aggregate the private measurement values (e.g., numbers of viewers, and ratings) from users for audience measurement, without revealing each user's actual value, i.e., letting $p_i$ be the single private measurement value of user i, various embodiments obtain the aggregated value $\Sigma_i p_i$ without having to know the actual value of $p_i$.

Figure 4:
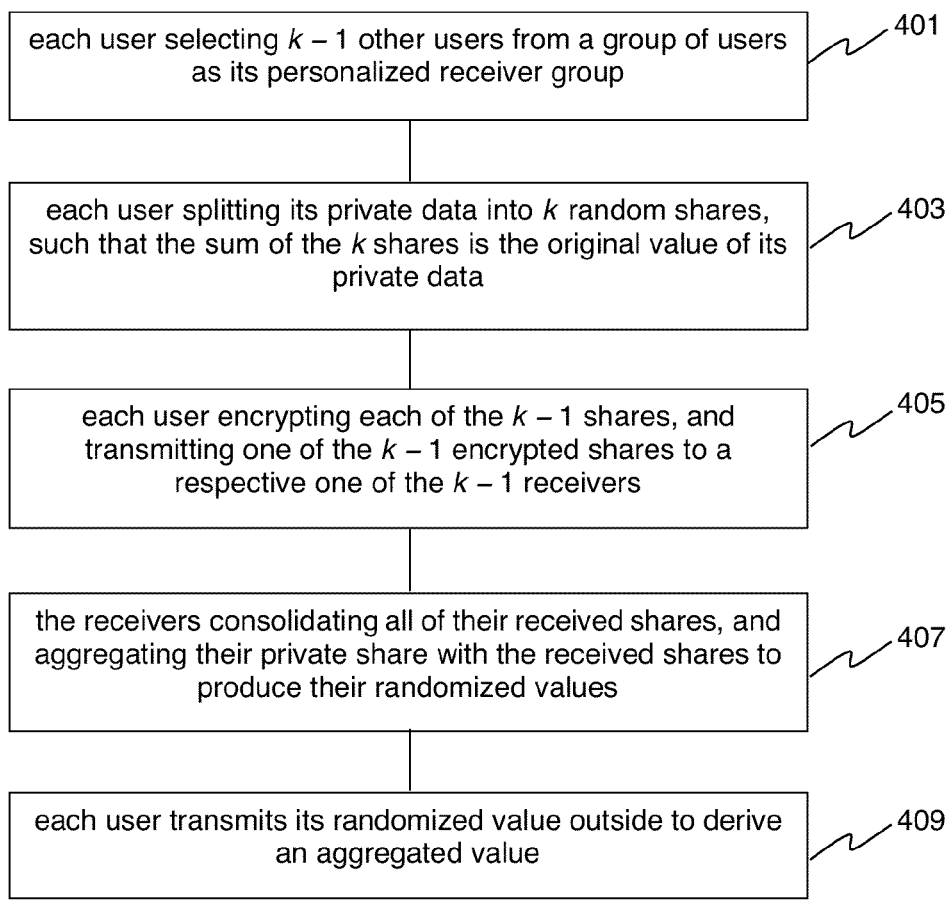
FIG. 4 shows a flowchart illustrating a method for collecting audience information of a group of users in an audience measurement according to another embodiment.

FIG. 4 shows a flowchart illustrating a method for collecting audience information of a group of users according to another embodiment.

In accordance with the embodiments of FIG. 4, a direct randomization approach is provided which more securely and efficiently aggregates users' private values $p_i$ while preserving users' privacy. The method in accordance with the embodiments of FIG. 4 is described below.

At 401, each user selects k−1 other users from the network (including a group of users) as its personalized receiver group. The selection criteria may be completely determined by each user, and thus the receiver groups are personalized. In an embodiment, the composition of each user's receiver group may be even dynamically modified by the user any time before the AM service is requested. The feature can be used to provide personalization service and it can be naturally incorporated in the personalized recommendation.

At 403, each user splits its private data into k random shares, such that the sum of the k shares is the original value of its private data.

At 405, keeping one share to itself, each user uses receivers' public keys of an additively homomorphic cryptosystem to encrypt each of the remaining k−1 shares, and then transmits one of the k−1 encrypted shares to a respective one of the k−1 receivers. According to the embodiment, one share of the private data stays secret with the user and is never disclosed outside of the user. This would make the method of various embodiments resistant against collusion of up to k−2 receivers.

At 407, the receivers may consolidate all of their received shares, and aggregate their private share with the received shares to produce their randomized values. Due to the additive homomorphism, the receivers can consolidate all of their received shares without separately decrypting each of them, unlike in the Shamir's secret sharing approach. According to this embodiment, each user may decrypt only once to obtain its randomized value, which significantly reduces the receivers' workload as the cost of one modular multiplication is negligible compared to that of one decryption operation.

At 409, each user transmits its randomized value outside to derive an aggregated value.

The randomized value may be transmitted to an intermediate device for aggregating the randomized value and transmitting the aggregated information to an audience measurement server. In another embodiment, as the randomized value does not reveal the actual private data of the users, the randomized value may also be directly transmitted to the audience measurement server which will determine the aggregated information.

In the following, the method of various embodiments is elaborated using a 3-party example, assuming k=n=3, wherein n represents the number of users in a group of users and k represents a predetermined number of receivers selected by each user.

In an initialization step, each party randomly splits its private value into 3 portions for its receiver parties (including itself):

$$p_1 = p_{1,1} + p_{1,2} + p_{1,3},$$

$$p_2 = p_{2,2} + p_{2,1} + p_{2,3}, \text{ and}$$

$$p_3 = p_{3,3} + p_{3,1} + p_{3,2}$$

wherein pi is the private value of Party i,
pi,j is the random portion/number transmitted from Party i to Party j, and
the desired aggregated private information is represented by p=p1+p2+p3.

In an exchanging step, every party encrypts each of its splits using the intended receiver's public key using a cryptosystem with the additive homomorphic property, i.e., Enc (x+y)=Enc(x)×Enc(y), and transmits the encrypted splits to the intended receivers.

In this illustrative 3-party example, Party 1 sends its encrypted splits $\text{Enc}_{P_2}(p_{1,2})$ and $\text{Enc}_{P_3}(p_{1,3})$ to Party 2 and Party 3, respectively. Party 2 sends its encrypted splits $\text{Enc}_{P_3}(p_{2,3})$ and $\text{Enc}_{P_1}(p_{2,1})$ to Party 3 and Party 1, respectively. Party 3 sends its encrypted splits $\text{Enc}_{P_1}(p_{3,1})$ and $\text{Enc}_{P_2}(p_{3,2})$ to Party 1 and Party 1, respectively.

In an consolidation and aggregation step, Parties 1, 2 and 3 consolidate the encrypted random values they received from the other parties, decrypt the consolidated values, and aggregate their private split with the decrypted value as follows:

$$p'_1 = p_{1,1} + \text{Dec}_{P_1}(\text{Enc}_{P_1}(p_{2,1}) \times \text{Enc}_{P_1}(p_{3,1})) = p_{1,1} + p_{2,1} + p_{3,1}$$

$$p'_2 = p_{2,2} + \text{Dec}_{P_2}(\text{Enc}_{P_2}(p_{1,2}) \times \text{Enc}_{P_2}(p_{3,2})) = p_{2,2} + p_{1,2} + p_{3,2}$$

$$p'_3 = p_{3,3} + \text{Dec}_{P_3}(\text{Enc}_{P_3}(p_{1,3}) \times \text{Enc}_{P_3}(p_{2,3})) = p_{3,3} + p_{1,3} + p_{2,3}$$

wherein $\text{Dec}_{P_i}$ represents a decryption operation at Parity i. $p'_i$ represents the randomized information of Parity i.

In the above embodiment, since the encrypted splits have been encrypted using a cryptosystem with the additive homomorphic property, i.e., Enc(x+y)=Enc(x)×Enc(y), each party may consolidate the received encrypted random values by multiplying these encrypted random values, and then perform only one decryption operation on the product of the encrypted random values.

In the final aggregation and submission step, the randomized information of all Parties 1, 2 and 3 are aggregated to produce the aggregated private information of all parties:

$$p' = p'_1 + p'_2 + p'_3 = p_1 + p_2 + p_3 = p$$

wherein p' represents the aggregated randomized information of all parties. As shown in the above equation, the aggregated randomized information of all parties equals to the aggregated private values of all parties.

To prove the correctness of the above approach, assuming the (k−1)-receiver group of the sender S with index i is represented by $\text{ID}_i = \{s_{i,1}, \ldots, s_{i,k-1}\}$, the private value $d_i$ of s is split as follows:

$$d_i = r_{i,i} + O_{i,s_{i,1}} + \ldots + O_{i,s_{i,k-1}}.$$

Wherein $r_{i,i}$ is the random share kept to Party i itself, $O_{i,j}$ is the randomized split value sent from Party i to j Therefore the aggregated private value is $$\text{Sum} = \sum_{i=1}^{n} d_i$$

$$= \sum_{i=1}^{n} \left( r_{i,i} + O_{i,s_{i,1}} + \ldots + O_{i,s_{i,k-1}} \right)$$

$$= \sum_{i=1}^{n} \left( r_{i,i} + \text{Dec}(\text{Enc}(I_{s_1,i,i}) \times \ldots \times \text{Enc}(I_{s_m,i,i})) \right)$$

$$= \sum_{i=1}^{n} \left( r_{i,i} + I_{s_1,i,i} + \ldots + I_{s_m,i,i} \right)$$

$$= \sum_{i=1}^{n} d'_i$$

wherein $I_{i,j}$ is the randomized split value received by Party j from Party i; Enc and Dec denote additively homomorphic encryption and decryption respectively; and m is the number of times Party i plays the role of the receiver (m≥0).

The proposed approach according to various embodiments above enables the aggregated total of the private values, i.e., $\sum_{i=1}^{n} d_i$, to be computed indirectly but accurately by aggregating (e.g., summing) the randomized values $\sum_{i=1}^{n} d'_i$.

The approach above protects each private value (e.g., the number of viewers and ratings) used for audience measurement by splitting it into k random numbers. Even knowing k−1 random numbers by the adversary tells complete nothing about the private value, thus providing extremely strong security for the users.

Figure 5:
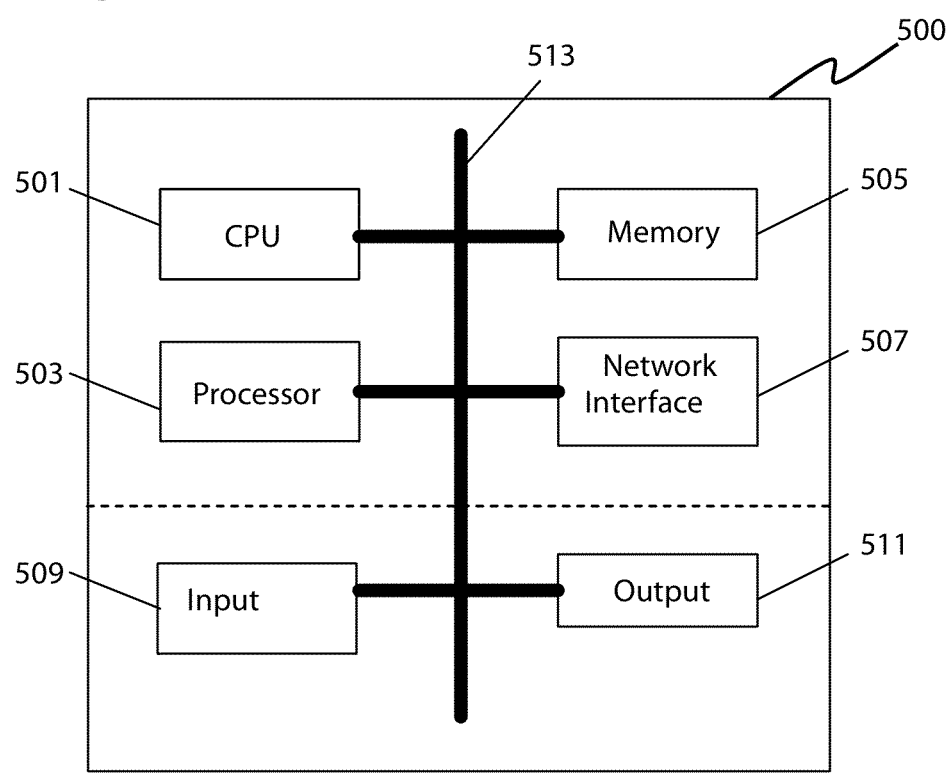
FIG. 5 shows a schematic diagram of a device according to an embodiment.

FIG. 5 shows a schematic diagram of a device according to an embodiment.

The device 500, either being a user device for producing randomized information or an intermediate device for producing aggregated private information as described above, may be implemented by a computer system, and may be used in the method described above. The computer system may include one or more of a CPU 501 (central processing unit), a processor 503, a memory 505, a network interface 507, input interface/devices 509 and output interface/devices 511. All the components 501, 503, 505, 507, 509, 511 of the computer system 500 are connected and communicating with each other through a computer bus 513.

The memory 505 may be used for storing various information or values which are generated, processed or received by the device 500 according to the method of the embodiments. The memory 505 may include more than one memory, such as RAM, ROM, EPROM, flash memory, hard disk, etc. wherein some of the memories are used for storing data and programs and other memories are used as working memories.

In an embodiment, the memory 505 may be configured to store instructions for the process of collecting audience information as described in various embodiments above. The instructions, when executed by the CPU 501, may cause the CPU 501 to carry out the process as described in various embodiments above. The instruction may also cause the CPU 501 to store the various generated/processed/received information or values according to the method of the embodiments in the memory 505.

In another embodiment, the processor 503 may be a special purpose processor for executing the instructions described above.

The CPU 501 or the processor 503 may be connected to a network through the network interface 507. In an embodiment, the network interface 507 may be an interface providing access to an IP network.

The Input 509 may include a keyboard, a touch screen, a mouse, etc. The output 511 may include a display.

In one embodiment, the device 500 may include a transceiver (not shown) configured to transmit one or more exchange portions to selected receiver devices and to receive one or more exchange portions from other devices, respectively. The transceiver may also be configured to receive randomized information from a group of user devices and to transmit aggregated information to an audience measurement server. In one embodiment, the transceiver is embedded into the network interface 507. The transceiver may also be an external transceiver in another embodiment.

In an embodiment, the device 500 may further include an encryptor and a decryptor configured to respectively encrypt and decrypt the exchange portions in accordance with the method described above. The encryptor and the decryptor may be implemented within the CPU 501 or the processor 503.

In a further embodiment, the device 500 may include a divider configured to divide its private information into a private portion and a plurality of exchange portions in accordance with the method described above. The divider may be implemented within the CPU 501 or the processor 503.

In a further embodiment, the device 500 may include an aggregator configured to perform the aggregation in accordance with the method described above. The aggregator may be implemented within the CPU 501 or the processor 503.

Compared with the existing permission-based scheme which is essentially a "can see, can use; cannot see, cannot use" scheme, the method and device of various embodiments provide a completely orthogonal "use, but not see" solution allowing an AM system "use" the users' private data to generate aggregated report without "seeing" the actual individual private data. This advantage further protects each user even after user permission is granted, which encourages more users to participate in the audience measurement.

Further, the method and device of various embodiments allow each user to choose its own receiver group so that different users can have different receiver group. This advantageous feature provides significantly stronger security compared to secret sharing approach as it reduces the risk of malicious collusion in two ways. Firstly, the security of one party depends on its k receivers who are completely chosen by the party; as long as there is one receiver among the receiver group who would not be compromised, the privacy of the party is preserved. In addition, the adversary has to control around ak parties to attack a persons (as the receiver overlaps are quite small when n>>k, n represents the total number of users in a group of users).

In a further aspect, various embodiments only require one single decryption for each receiver, because each receiver is allowed to consolidate its received messages by simply multiplying them according to the additively homomorphic property. This advantageous feature introduces a constant decryption cost to each receiver regardless of m, the number of messages received. Hence, the cost to achieve confidentiality for each receiver in the method of various embodiments has a complexity of O(1) decryptions+O(m) modular multiplications. Compared to Shamir's secret sharing which introduces a complexity of O(n) decryptions on each receiver, the method of various embodiments significantly increases the total efficiency by reducing the receivers' workload because: (1) m<<n, which can be as large as a few millions in the case of IPTV AM, and (2) cost of one modular multiplication is negligible compared to that of one decryption.

Compared with Shamir's secret sharing, the method of various embodiments eliminates the polynomial computations required under Shamir's secret sharing. This advantageous feature further improves the total efficiency by eliminating the extra cost (i.e., $O(k^3)$ modular multiplications for each sender and $O(k^2)$ modular multiplications for each receiver) required by Shamir's secret sharing due to its polynomial computations.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for collecting audience information of a group of users user devices in an audience measurement, the method comprising:
    each user device dividing a private information into a private portion and at least a first exchange portion and a second exchange portion, wherein the private information of each user device is a number or is represented by a number, and each user device divides its private information by splitting the number into a plurality of sub-numbers, wherein a sum of the plurality of sub-numbers equals to the number;
    each user device transmitting the first exchange portion to a first user device and the second exchange portion to a second user device, the first user device and the second user device selected from the group of user devices;
    each user device aggregating its private portion and exchange portions received from other user devices of the group of user devices, thereby producing randomized information, wherein the aggregating by each user device comprises summing its private portion and the exchange portions received from other user devices of the group of user devices; and
    aggregating the randomized information from each user device of the group of user devices, thereby producing aggregated private information for the group of user devices, wherein the aggregating of the randomized information comprises summing the randomized information of the group of user devices.

2. The method of claim 1, further comprising each user device randomly dividing its private information into the private portion and the predetermined number of exchange portions.

3. The method of claim 1, further comprising each user device independently selecting the predetermined number of user devices from the group of user devices, and transmitting each of its exchange portions to the respective selected user device.

4. The method of claim 1, further comprising each user device encrypting the predetermined number of exchange portions, and transmitting each of the encrypted exchange portions to the respective user device selected from the group of user devices.

5. The method of claim 4, wherein each user device encrypts each of its exchange portions using a public key of the respective user device selected to receive the respective encrypted exchange portion, said public key being of an additively homomorphic cryptosystem.

6. The method of claim 5, further comprising each user device receiving encrypted exchange portions from other user devices of the group of user devices, and decrypting the received encrypted exchange portions.

7. The method of claim 6, further comprising each user device consolidating the received encrypted exchange portions, and decrypting the consolidated encrypted exchange portions.

8. The method of claim 7, wherein each user device consolidating the received encrypted exchange portions by multiplying the received encrypted exchange portions, and decrypting the product of the received encrypted exchange portions.

9. The method of claim 6, further comprising each user device aggregating its private portion and the decrypted exchange portions, thereby producing the randomized information of the user device.

10. The method of claim 1, further comprising transmitting the aggregated private information for the group of user devices to an audience measurement server.

11. The method of claim 1, wherein the predetermined number is less than the number of user devices in the group of user devices.

12. The method of claim 1, wherein the private information of each user device comprises one or more pieces of information selected from the group consisting of:
a number of viewers;
demographic of viewers;
ratings;
audience movement across programs and applications;
audience engagement; and
interaction of viewers.

13. A user device for providing audience information in an audience measurement, the user device comprising:
a divider configured to divide its private information into a private portion and at least a first exchange portion and a second exchange portion, wherein the private information of each user device is a number or is represented by a number, and the user device divides its private information by splitting the number into a plurality of sub-numbers, wherein a sum of the plurality of sub-numbers equals to the number;
a transmitter configured to transmit the first exchange portion to a first user device and the second exchange portion to a second user device, the first user device and the second user device selected by the user device;
a receiver configured to receive exchange portions from other user devices of a group of user devices;
an aggregator configured to aggregate its private portion and the exchange portions received from said other user devices, wherein the aggregating by the user device comprises summing its private portion and the exchange portions received from other user devices of the group of user devices, thereby producing randomized information of the user device, and
wherein the transmitter is further configured to transmit the randomized information from the user device for aggregating the randomized information of the group of user devices thereby producing aggregated private information for the group of user devices, wherein the aggregating of the randomized information comprises summing the randomized information of the group of user devices.

14. The user device of claim 13, further comprising an encryptor configured to encrypt its predetermined number of exchange portions.

15. The user device of claim 13, further comprising a decryptor configured to decrypt the exchange portions received from said other user devices.

* * * * *